(No Model.)
A. GUENDEL.
ELECTRIC ARC LAMP.
No. 578,233. Patented Mar. 2, 1897.
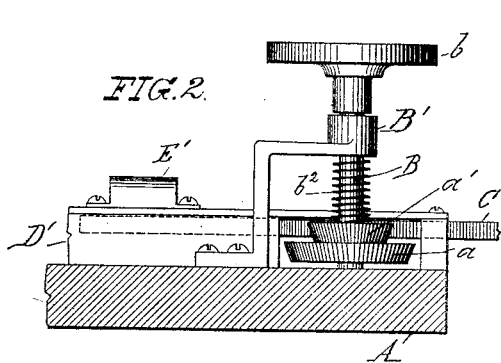
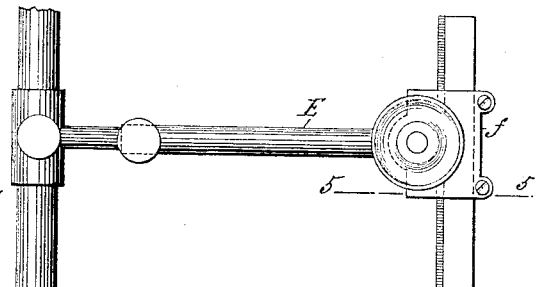
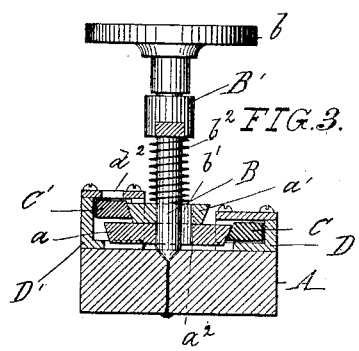
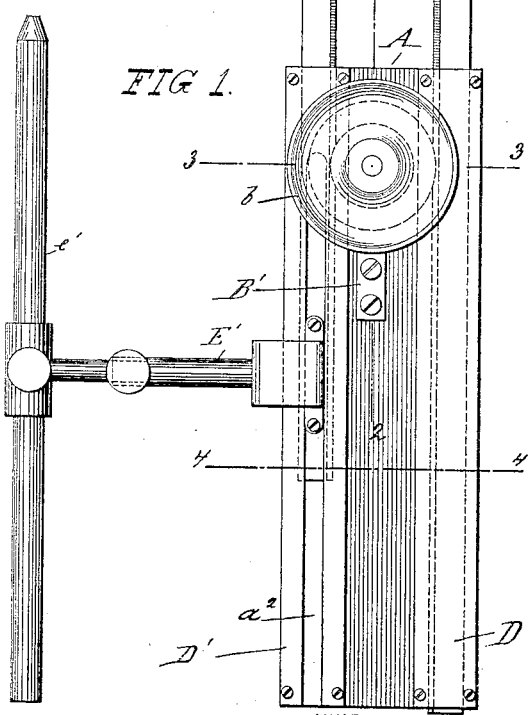
WITNESSES:
Charles Fraufut
Harry M. Wiltner
INVENTOR
Anton Guendel
BY Charles Kay
ATTORNEY.

UNITED STATES PATENT OFFICE.

ANTON GUENDEL, OF NEW YORK, N. Y.

ELECTRIC-ARC LAMP.

SPECIFICATION forming part of Letters Patent No. 578,233, dated March 2, 1897.

Application filed July 7, 1896. Serial No. 598,311. (No model.)

*To all whom it may concern:*

Be it known that I, ANTON GUENDEL, a citizen of the United States, and a resident of New York, in the county and State of New York, have invented certain new and useful Improvements in Electric-Arc Lamps, of which the following is a specification.

My invention has reference to improvements in electric-arc lamps, and has for its purpose to provide a device by means of which the carbons of the lamp can be easily and reliably adjusted.

This device is illustrated in the accompanying drawings, in which—

Figure 1 is a front view of the same; and Figs. 2 to 5 are sections on lines 2 2, 3 3, 4 4, and 5 5, respectively, of Fig. 1.

Similar letters of reference indicate corresponding parts.

A in the drawings is a base-plate carrying an upright turnable shaft B, which, by means of a knob $b$, can be rotated to the right or left hand side. The shaft is surrounded by a gear-wheel or friction-roller $a$, that carries a second gear-wheel or friction-roller $a'$ of a smaller diameter, which is either made integral with the wheel or roller $a$ or fastened to the same in any reliable manner so that both wheels or rollers rotate simultaneously. The gear-wheels or friction-rollers have a notch or recess $a^2$, into which a lateral extension $b'$ of the shaft B projects, that engages the said gear-wheels or friction-rollers in such a manner that they follow the rotation of the shaft.

B' is a support of any suitable shape that is attached to the shaft B, and a spring $b^2$ is placed between the said support and the gear-wheels or friction-rollers and presses against the upper wheel or roller $a'$ and the support, so that the gear-wheels or friction-rollers are firmly held in position on the base-plate A. Laterally to the gear-wheels or friction-rollers two ratchet or friction bars C C' are located and guided in casings D D', in which they are so held that they come with their toothed or serrated edges or friction-surfaces in contact with the gearings or friction-surfaces of the wheels or rollers $a$ and $a'$, respectively. To keep the bars C C' more reliably in place and in contact with the respective gear-wheels and friction-rollers, the serrated edges or friction-surfaces of the bars are downwardly beveled and correspond with upward bevels of the wheels or rollers $a$ and $a'$, as clearly shown in Figs. 2 and 3, the bevels preventing the bars located in the casings D and D' from being raised beyond the respective gear-wheels or friction-rollers, so that they have to move in a perpendicular line.

To the bars C C' brackets E and E' are attached, which extend laterally from the said bars in the same direction and terminate in the same vertical line, so that the carbons $e$ and $e'$, carried by the brackets, point against each other. The base of the bracket E' projects through a longitudinal slot $c$ in the guide-casing D', and the base of the bracket E consists of a loop $f$, pushed over the bar C outside its casing, which loop has a gear-wheel or friction-roller $f'$ journaled in the same and meshing with the said bar C, so that the bracket is not alone held in position on the bar, but can also be moved up or down by turning the said wheel or roller $f'$.

It is evident that by turning the knob $b$ and rotating thereby the shaft B and the gear-wheels or friction-rollers $a$ and $a'$ the ratchet or friction bars C and C', being in contact with the said gear-wheels or friction-rollers, will be shifted up or down in different directions, as they are located in opposite positions to the peripheries of their corresponding gear-wheels or friction-rollers, so that they move either toward or from each other, and as the diameter of the lower wheel or roller $a$ is larger than that of the upper wheel or roller $a'$ it is clear that the bar C, engaged by the lower wheel or roller, will move quicker and travel a longer distance than the bar C'.

It is a fact that in electric-arc lamps the upper carbon is consumed by the heat produced by the electric current in a shorter time than the lower carbon, and that to create the required distance between the two carbons to produce the arc-light the motion of the carbons toward each other must be so regulated that, notwithstanding the mentioned different combustions, the carbons travel toward each other the proper way to be kept continuously in the correct distance from each other. This is attained by the simultaneous rotation of the gear-wheels or friction-rollers $a$ and $a'$ and their action upon the ratchet-bars or friction-rollers carrying the carbon-holding brackets, as explained before. This action is always the same either if the knob of the shaft B is turned by hand or if the shaft is rotated by an automatically-acting carbon-feeding device.

If desired, the ratchet-wheels or friction-rollers $a$ and $a'$ may be integral with the shaft B, but I prefer the arrangement shown and described, as in the same the said wheels or rollers are better kept in place and worked-out wheels or rollers can be easily substituted by new ones.

Having thus described my invention, I claim as new and desire to secure by Letters Patent—

In an electric-arc lamp, a rotating shaft on a base-plate, two simultaneously-rotating gear-wheels or friction-rollers with different diameters having their outer peripheries beveled and being attached to the said shaft, and two ratchet or friction bars guided in casings attached to the base-plate and having their contact edges beveled to correspond with the bevels of the gear-wheels or friction-rollers, one of the bars being engaged by one gear-wheel or friction-roller and the other one by the second gear-wheel or friction-roller, in combination with carbon-holding brackets attached to the said ratchet-bars, substantially as set forth.

Signed at New York, in the county and State of New York, this 22d day of May, A. D. 1896.

ANTON GUENDEL.

Witnesses:
CHAS. KARP,
HARRY M. WILLNER.